United States Patent
Rueb et al.

[19]

[11] Patent Number: 6,011,255
[45] Date of Patent: Jan. 4, 2000

[54] LASER SCANNING METHOD AND SYSTEM

[75] Inventors: Kurt D. Rueb, Kitchener; Wayne R. Miller, Kirchener, both of Canada

[73] Assignee: Virtek Vision Corporation, Waterloo

[21] Appl. No.: 09/026,387

[22] Filed: Feb. 19, 1998

Related U.S. Application Data

[63] Continuation-in-part of application No. 08/970,478, Nov. 14, 1997.

[51] Int. Cl.[7] .................................................. G01B 11/00
[52] U.S. Cl. ............... 250/234; 250/559.06; 250/559.19; 250/559.24; 356/372; 356/380; 356/387
[58] Field of Search ..................................... 250/234, 235, 250/236, 559.06, 559.19, 559.22, 559.24, 559.26, 559.36, 559.4, 559.42, 559.44; 356/372, 376, 377, 380, 386, 387

[56] References Cited

U.S. PATENT DOCUMENTS

| | | | |
|---|---|---|---|
| 4,061,914 | 12/1977 | Green .................................. | 250/234 |
| 4,635,289 | 1/1987 | Doyle et al. ........................ | 382/8 |
| 5,291,270 | 3/1994 | Koch et al. ........................ | 356/372 |
| 5,369,284 | 11/1994 | Bellio ............................... | 250/559.36 |
| 5,388,318 | 2/1995 | Petta ................................ | 250/235 |

*Primary Examiner*—John R Lee
*Attorney, Agent, or Firm*—Howard & Howard

[57] ABSTRACT

A laser scanning method and system for determining an outline of an object. A laser beam is projected at the object and a surface underlying the object. The surface is configured to reflect the laser beam differently than the object. The laser beam is reflected off the object and the surface producing reflected beams. The reflected beams are received by a control which determines whether the beam was reflected from the object or the surface. By identifying this with the laser position the control can identify the part outline. As the laser beam is scanned over successive positions along the surface, the outline of the object is precisely determined. In a preferred embodiment, the laser scanning system further includes a transparent support for supporting the object a predetermined distance from the surface thereby increasing the scanning resolution and improving the accuracy of the system.

15 Claims, 2 Drawing Sheets

LASER SCANNING METHOD AND SYSTEM

This is a continuation-in-part of application Ser. No. 08/970478, filed Nov. 14, 1997.

BACKGROUND OF THE INVENTION

This invention relates to a laser scanning method and system for determining an outline of an object.

Many industrial processes produce large parts, i.e., parts 2'×2' or greater, requiring a high degree of dimensional accuracy. For example, computer controlled laser cutting or stamping machines can produce large sheet metal parts with a dimensional tolerance of +/−0.004". Often, such large precise parts must be inspected to verify compliance with established dimensional tolerances.

To eliminate human error in the measurement of such large precise parts, the prior art has taught to establish an automated inspection system using solid state CCD camera technology. However, the use of solid state CCD camera technology to inspect the dimensional accuracy of a large precise part has several shortcomings. These prior art inspection systems are expensive and time consuming.

Lasers have been used to capture analog signals from an object and the surrounding area. These systems essentially operate like a CCD camera.

Lasers have also been used to project an outline or template for placement of a part. However, lasers have not been used to determine the dimensional outline of a part and thereby inspect the part for dimensional accuracy.

SUMMARY OF THE INVENTION

In a disclosed method and embodiment of this invention, a laser beam is projected at an object and a surface underlying the object. The surface is configured to reflect the laser beam differently than the object. The laser beam is reflected off the object and the surface and the reflected beams are captured. A control determines whether the beams were reflected from the object or the surface. As the laser beam is scanned over successive positions along the surface, the outline of the object is precisely determined.

In a preferred method, a coarse scan with the laser beam over the object and the surface is performed to establish a rough outline of the object and determine a starting position on the outline of the object. Thereafter, a fine scan, beginning at the starting position, is performed only over successive positions along the rough outline of the object.

In a preferred embodiment, the laser scanning system further includes a transparent support for supporting the object a predetermined distance from the surface thereby increasing the scanning resolution and improving the accuracy of the system.

In the above-described methods and embodiments, it is required that the system be able to accurately identify the three-dimensional position and orientation of the laser projector with respect to the surface. Known methods of identifying the actual three-dimensional position and orientation may be utilized.

The laser scanning methods and embodiments described above may be used to determine the precise outline of a part, such as sheet method stamping. In this manner, the part may be inspected to verify compliance with established dimensional tolerances.

These and other features of the present invention can be best understood from the following specification and drawings, of which the following is a brief description.

DETAILED DESCRIPTION OF A PREFERRED EMBODIMENT

Figure 1:
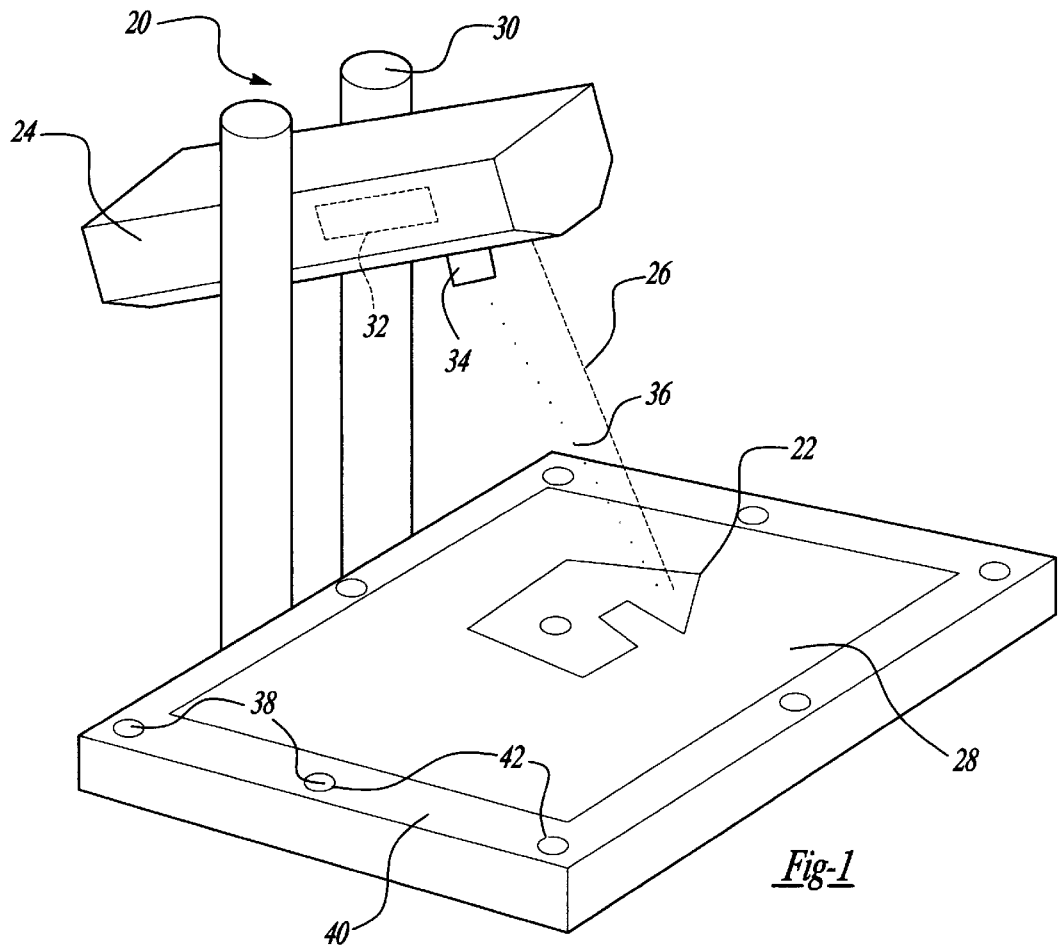
FIG. 1 is a perspective view of a first embodiment of a laser scanning system according to the present invention.

FIG. 1 shows a first embodiment of a laser scanning system 20 for determining an outline of a part or object 22. The laser scanning system 20 includes a laser projector 24 projecting a laser beam 26. The object 22 to be scanned is placed upon a surface 28. Preferably, the surface 28 is covered with a retroreflective material, such as 3M Scotchlite "Engineering Grade" retroreflective sheeting 3290. However, as will become apparent to one skilled in the art, any surface configured to reflect the laser beam 26 differently than the object 22 may be used. The laser projector 24 must be mounted to a stable support structure 30. One skilled in the art will recognize that the laser projector 24 may be mounted by any means, including suspension from a ceiling, provided that the structure experiences only long term drift and not dynamic vibrations. A laser projector 24 having a sixty degree scan angle can produce a scan area of approximately 7'×7' when suspended from a height of 6' with a resolution of approximately 0.002" per scan step.

The laser scanning system 20 further includes a control 32 for scanning the laser beam 26 over the object 22 and the surface 28. The control 32 includes a reflection sensor 34 for receiving a reflected beam 36. These components are known in this art, and are illustrated schematically. Once a reflected beam 36 is received, the control 32 determines whether the beam 36 was reflected from the object 22 or the surface 28. As the laser beam 26 is scanned over successive positions along the surface 28, the outline of the object 22 is precisely determined.

Essentially, the control 32 will always know "where" the laser beam is being directed. By associating this location with the type of reflected beam, the control will be able to identify whether a particular location is object or "surface". In this way, the control is able to identify an outline of the object.

In a preferred method, a course scan with the laser beam 26 over the object 22 and the surface 28 is initially performed to establish a rough outline of the object 22 and to determine a starting position on the outline of the object 22. Thereafter, a fine scan, beginning at the starting position, is performed only over successive positions along the rough outline of the object 22. As a result, the amount of scan time necessary to determine the precise outline of the object 22 is reduced. This first embodiment of the invention is capable of measuring hundreds of locations along the outline of the object 22 each second. For example, if measurements are taken every 0.010" along the outline of the object 22, approximately 5" of outline can be scanned each second.

The laser scanning system 20 must accurately calculate the three-dimensional position and orientation of the laser projector 24 with respect to the surface 28. Known methods of calculating the actual three-dimensional position and orientation may be utilized. Thus, the laser scanning system 20 includes at least four, but preferably eight, calibration targets 38; as known, calibration targets 38 are shown formed by positioning a frame 40 having a plurality of apertures 42 above and along the outer edges of the surface 28. However, other calibration techniques may be used. The plurality of apertures 42 expose the surface 28 lying underneath the frame 40 and, thereby, establish the calibration targets 38.

In this first embodiment of the invention, a surface is placed adjacent the object. If a reflective surface is utilized, then the intensity of the reflected beam from the surface will be much greater than the intensity of the reflected beam from the object. In this way, the sensor can establish a minimum value for identifying a reflection. In such a system, the sensor could include an on/off switch, and the reflection from the object will be "off" while reflections from the surface will be "on". In other applications, the sensor can be more sophisticated and able to identify gradations in the value of the reflected beams. With such systems the surface need not be as starkly different in reflective capability. Thus, surfaces which are simply white paper may be utilized, and still will be capable of being sufficiently different in reflective qualities relative to the object to allow the invention to work.

Figure 2:
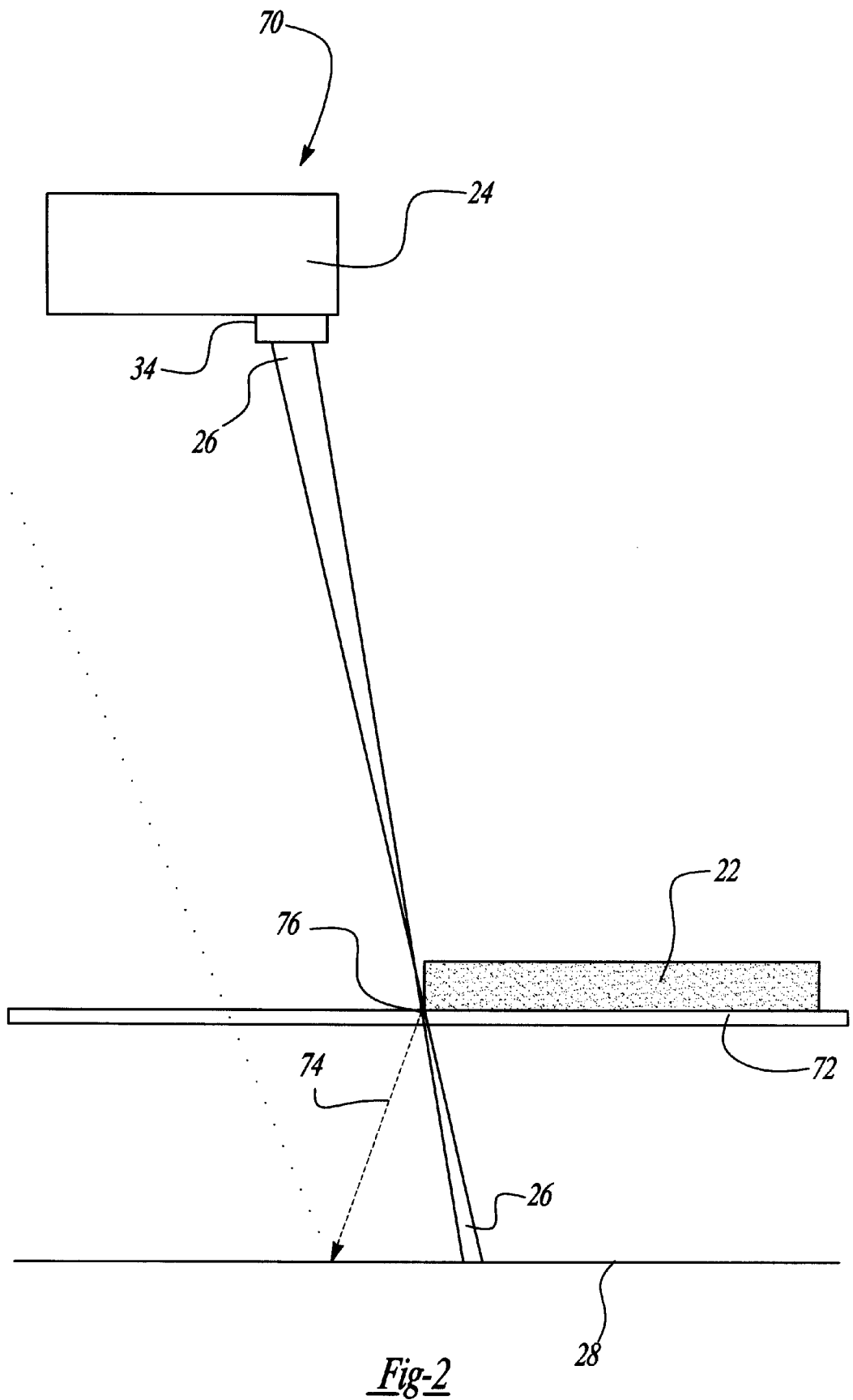
FIG. 2 is a perspective view of a preferred embodiment of a laser scanning system according to the present invention.

FIG. 2 shows a preferred embodiment of a laser scanning system 70 according to the present invention. In contradistinction with the first embodiment 20, the object 22 is placed upon and supported by a transparent support 72, such as a glass plate, a predetermined distance from the reflective surface 28. This preferred embodiment of the laser scanning system is adapted for high resolution scanning, that is scanning resolution requiring greater than 0.001" per scan step. Further, this preferred embodiment is adapted to scatter reflections 74 of the laser beam 26 off the sides of the object 22 and thereby prevent the capture of such reflections 74 by the reflection sensor 34.

As discussed above, in the first embodiment the object 22 is placed directly upon surface 28. In general, fine grain retroreflective materials are formed from a sheet of fine spherical beads. In a high quality material, such as 3M Scotchlite "Engineering Grade" retroreflective sheeting 3290, the diameter of each bead ranges from 0.002 to 0.004". The projected laser beam 26 reflects off the inside surface of the bead and is captured by the reflection sensor 34. In high resolution scanning applications, the diameter of the beads become significant, and features and voids between the beads can produce large errors. Reflective materials formed from other types of shapes, such as prisms, are available, however, the typical component size is usually greater. Finally, in the first embodiment reflections of the laser beam 26 off the sides of the object 22 may further reflect off the surface 28 and be captured by the reflection sensor 34 thereby reducing the accuracy of the laser scanning system 20.

In this embodiment of the laser scanning system 70, the laser beam 26 is focused to a focus point 76 on transparent support 72. As a result, the laser beam 26 is defocused upon the reflective surface 28 thereby reflecting off a large number of reflective beads and essentially optically shrinking the effective size of each bead. The distance between the laser projector 24 and the transparent support 72 and the distance between the transparent support 72 and the reflective surface 28 may be varied to adjust the scanning resolution of the system 70. For example, a laser projector may focus a 5 mm laser beam upon an object positioned 5 feet beneath the laser projector with a reflective surface positioned 1 foot beneath the object. In this example, the laser beam is defocused to greater than 1 mm in diameter at the reflective surface thereby emcompassing a width of 15–20 beads and improving the scanning resolution. Further, in this preferred embodiment, reflections 74 of the laser beam 26 off the sides of the object 22 are scattered away from the reflection sensor 34 thereby improving the accuracy of the system 70.

Figure 3:
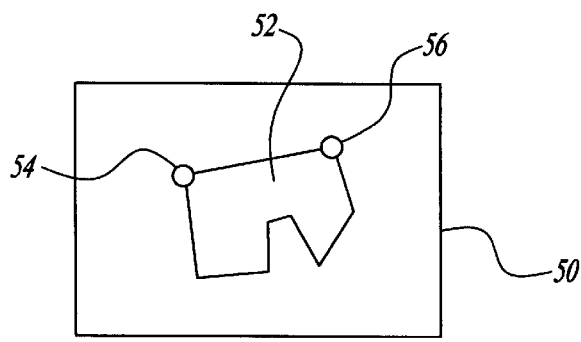
FIG. 3 shows one application of the present invention.

FIG. 3 shows a computer display 50 showing the determined outline 52 of the part. An operator may now use a computer mouse, or other movement or identification device to identify two points such as points 54 and 56 on the outline. Using known mathematical techniques, the system is then able to provide an indication of the dimensions between the identified point 54 and 56. Moreover, the entire dimensions of the part can also be determined utilizing known mathematical techniques.

Figure 4:
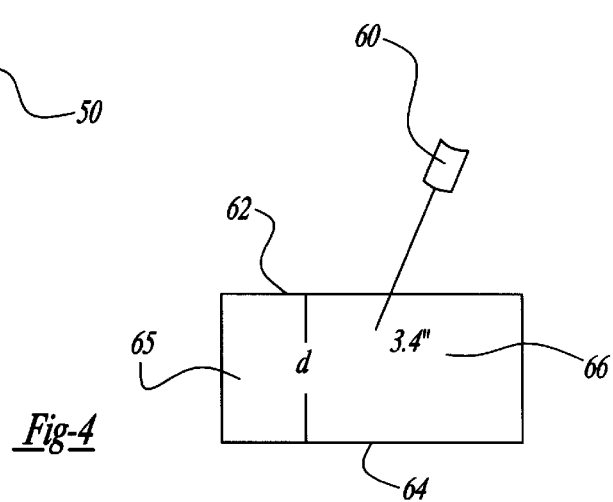
FIG. 4 shows another application of the present invention.

FIG. 4 shows another feature wherein a projector 60 identifies a long side 62 and 64 of the part 65. Those sides are spaced by a distance d. The system may be operable to then determine the distance d between sides 62 and 64 which may then be displayed such as at 66. This would assist an operator in checking the accurate dimensional characteristics at the work site, rather than having to travel to the computer. By serially moving amongst various locations on the part in performing a similar test, a worker will be able to easily perform quality control tests at the work location.

While there may be many applications of this invention, three primary ones are performing quality control tests on a part, and in particular a flat or two-dimensional part. Once the dimensions are entered in, they can be compared to stored CAD system data. In addition, the invention may be used for reverse engineering the shape and dimensions of a part. Also, the invention may be utilized to determine the dimensions of a part which has unknown dimensions.

The first embodiment of the invention is capable of determining the outline of a two-dimensional object at a resolution of 65536×65536 pixels. One skilled in the art will recognize that the laser projector 24 can further be used to display other usefull information. For example, the laser beam 26 could be projected to highlight any burrs found on the object 22. That is, if the scan identifies a flaw in the part, the laser can highlight the flaw to assist in identification. Further, if a CAD file is available, the laser beam 26 could project the actual CAD data for comparison with the object 22 or highlight any portions of the object 22 out of tolerance. Finally, one skilled in the art will appreciate that sampling analog voltages would allow capture of grey scale images and would allow effective scanning of surfaces such as paper, blueprints, and photographic images.

Several embodiments of this invention has been disclosed, however, a worker of ordinary skill in the art would recognize that certain modifications come within the scope of this invention. For that reason, the following claims should be studied to determine the true scope and content of this invention.

We claim:

1. A method for determining an outline of a two-dimensional object comprising the steps of:
    (1) providing a laser projector for projecting a laser beam;
    (2) providing a surface underlying said object;
    (3) scanning said laser beam over said object and said surface;
    (4) receiving a reflected beam;
    (5) determining whether said reflected beam was reflected from said surface or said object; and
    (6) determining said outline of said object based upon the determinations of step (5).

2. A method as recited in claim 1, wherein step (3) includes performing a coarse scan with said laser beam over said object and said surface to determine a starting position on said outline of said object.

3. A method as recited in claim 2, wherein step (3) includes performing a fine scan with said laser beam beginning at said staring position over successive positions along said outline of said object.

4. A method as recited in claim 1, wherein said surface is a retroreflective surface.

5. A method as recited in claim 1, wherein a control senses the qualities of the reflected beams from the object and the surface to determine whether a particular reflected beam is from the object or the surface, and said control associated said type of reflected beam with a particular location of the projected laser beam for identifying whether a particular location is object or surface.

6. A method as recited in claim 1, wherein a transparent support is provided for supporting said object a predetermined distance above said surface prior to step (3).

7. A method for determining an outline of a two-dimensional object comprising the steps of:

(1) providing a laser projector for projecting a laser beam;
   (2) providing a transparent support for supporting said object;
   (3) providing a surface beneath said transparent support and said object;
   (4) scanning said laser beam over said object and said surface;
   (5) receiving a reflected beam;
   (6) determining whether said reflected beam was reflected from said surface or said object; and
   (7) determining said outline of said object based upon the determinations of step (6).

8. A method as recited in claim 7, wherein step (4) includes performing a coarse scan with said laser beam over said object and said surface to determine a starting position on said outline of said object.

9. A method as recited in claim 8, wherein step (4) includes performing a fine scan with said laser beam beginning at said starting position over successive positions along said outline of said object.

10. A method as recited in claim 7, wherein said surface is a retroreflective surface.

11. A method as recited in claim 7, wherein a control senses the qualities of the reflected beams from the object and the surface to determine whether a particular reflected beam is from the object or the surface, and said control associated said type of reflected beam with a particular location of the projected laser beam for identifying whether a particular location is object or surface.

12. A laser scanning system comprising:

a laser projector for projecting a laser beam;
   a transparent support for supporting an object;
   a surface underlying said support for reflecting said laser beam, said surface configured to reflect said laser beam differently than the object; and
   a control means for scanning said laser beam over the object and said surface and determining an outline of the object based upon whether said laser beam was reflected from one of the object and said surface.

13. A laser scanning system as recited in claim 12, wherein said control means includes a reflection sensor to receive a reflected laser beam.

14. A laser scanning system as recited in claim 12, further including a plurality of calibration targets to calibrate said laser scanning system.

15. The method of claim 1 wherein the surface and the object have distinguishable reflectivities.

* * * * *